United States Patent [19]

Owen et al.

[11] Patent Number: 5,727,139
[45] Date of Patent: *Mar. 10, 1998

[54] METHOD AND APPARATUS FOR MINIMIZING NUMBER OF PIXEL DATA FETCHES REQUIRED FOR A STRETCH OPERATION OF VIDEO IMAGES

[75] Inventors: Richard Charles Andrew Owen, Seattle; Karl Scott Mills, Lynnwood; Mark Emill Bonnelycke, Seattle, all of Wash.; Bradley Andrew May, San Jose, Calif.; Vernon Dennis Hasz, Bellevue, Wash.

[73] Assignee: Cirrus Logic, Inc., Fremont, Calif.

[21] Appl. No.: 536,553

[22] Filed: Sep. 29, 1995

Related U.S. Application Data

[60] Provisional application No. 60/000,488, Jan. 23, 1995.
[51] Int. Cl.⁶ .................................................... G06F 15/00
[52] U.S. Cl. .................................................... 395/139
[58] Field of Search ........................... 395/139, 133; 345/127, 128, 129, 130

[56] References Cited

U.S. PATENT DOCUMENTS

| | | | |
|---|---|---|---|
| 4,864,517 | 9/1989 | Maine et al. | 364/521 |
| 4,918,436 | 4/1990 | Johary | 340/799 |
| 5,043,713 | 8/1991 | Katsura et al. | 340/747 |
| 5,179,639 | 1/1993 | Taaffe | 395/128 |
| 5,291,187 | 3/1994 | Wood et al. | 345/185 |
| 5,319,750 | 6/1994 | Matsuo et al. | 395/166 |
| 5,333,261 | 7/1994 | Guttag et al. | 395/162 |
| 5,586,237 | 12/1996 | Baecker et al. | 395/133 |

*Primary Examiner*—Phu K. Nguyen
*Attorney, Agent, or Firm*—Robert P. Bell; Steven A. Shaw

[57] ABSTRACT

A method and apparatus to stretch video images in a graphics controller chip of a computer system. The graphics controller chip fetches four pixel data comprising two pixel data each from a first scan line and a second scan line of a source video image, and generates a set of additional pixels in a rectangular area defined by the four pixels. The graphics controller chip stores the pixels of rectangular portions in a display memory, and displays the pixel data of the stretched video image in a scan line order.

24 Claims, 6 Drawing Sheets

METHOD AND APPARATUS FOR MINIMIZING NUMBER OF PIXEL DATA FETCHES REQUIRED FOR A STRETCH OPERATION OF VIDEO IMAGES

CROSS-REFERENCE TO RELATED APPLICATIONS

The present application claims priority from Provisional Application Ser. No. 60/000,488 entitled "Stretch Operation Maximizes Efficiency by Minimizing Fetches" filed Jun. 23, 1995.

FIELD OF THE INVENTION

The present invention relates generally to computer graphics systems and more specifically to stretching video images in a graphics controller chip of a computer system.

BACKGROUND OF THE INVENTION

A need frequently arises to stretch video images while displaying such video images on a computer system display. For example, a CD-ROM decoder on a computer system may provide a 160×120 pixel source video image which may be displayed as a 640×480 pixel image on a computer system display. In such a situation where the size of display image is larger than the size of source image, the source video image may need to be stretched to the larger display image while still maintaining the characteristics of the source video image.

Figure 1:
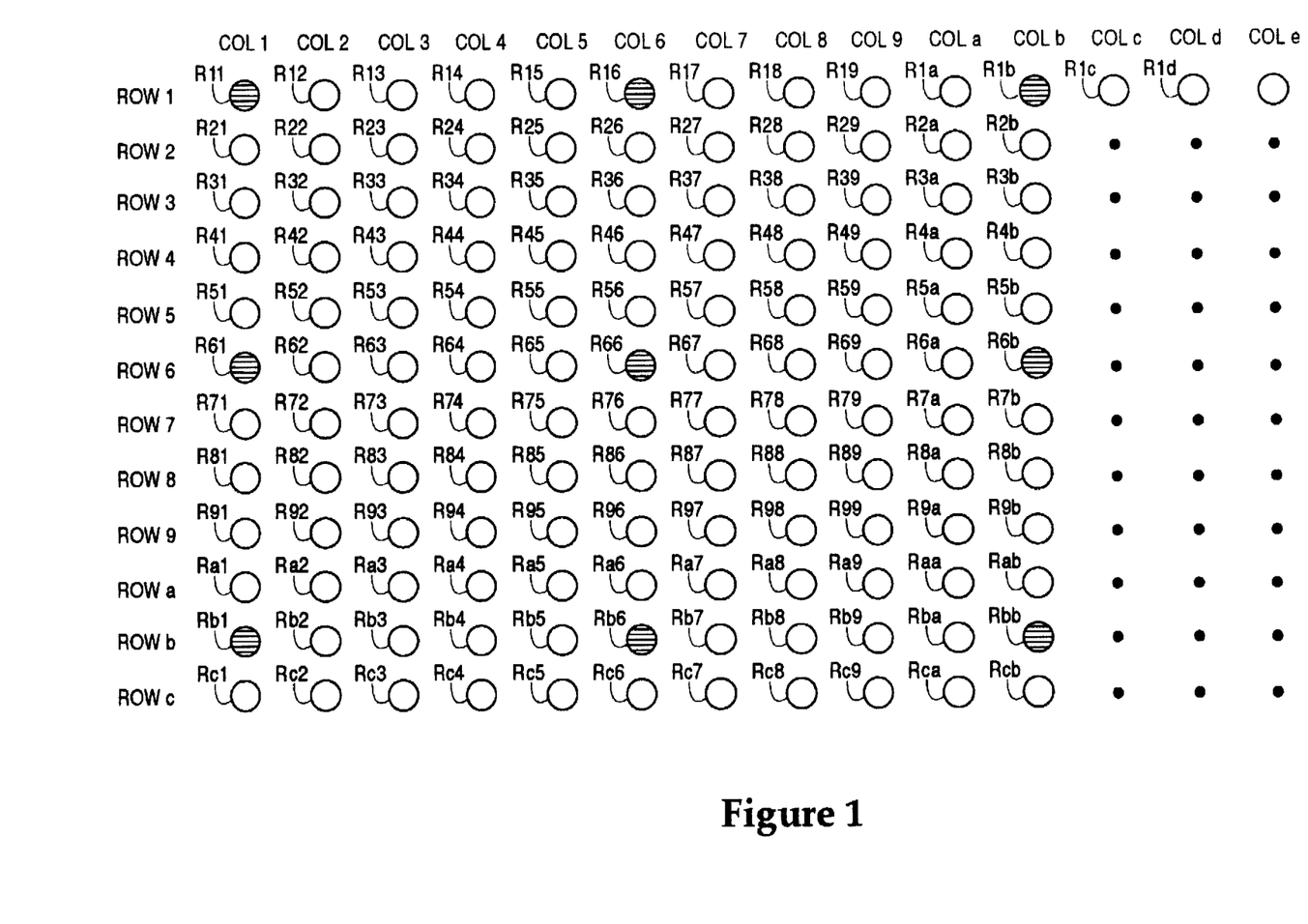
FIG. 1 is a diagram illustrating pixels in a source video image and additional pixels generated for a stretched video image.

Typical prior stretching operations involve taking pixels from adjacent scan lines of the source video data and generating additional pixels therebetween. FIG. 1 is a diagram illustrating pixels of such a stretched display image with source video pixels (R11, R61, Rb1, R16, R1b, R6b) shown in darkened circles, and additional pixels (pixels in rows 2-5, 7-A, columns 1-5, 7-A) generated from pixels in the source video image shown in light circles.

The additional pixels may be generated by interpolating adjacent pixels in the source video image. Pixels in the source video image may be represented in RGB format, in which case each of the RGB components of the additional pixels may be generated from a corresponding component of the pixels in the source video image. For example, R (Red) component of pixel R33 may be generated by averaging the R component of pixels R11, R16, R61 and R66.

Figure 2:
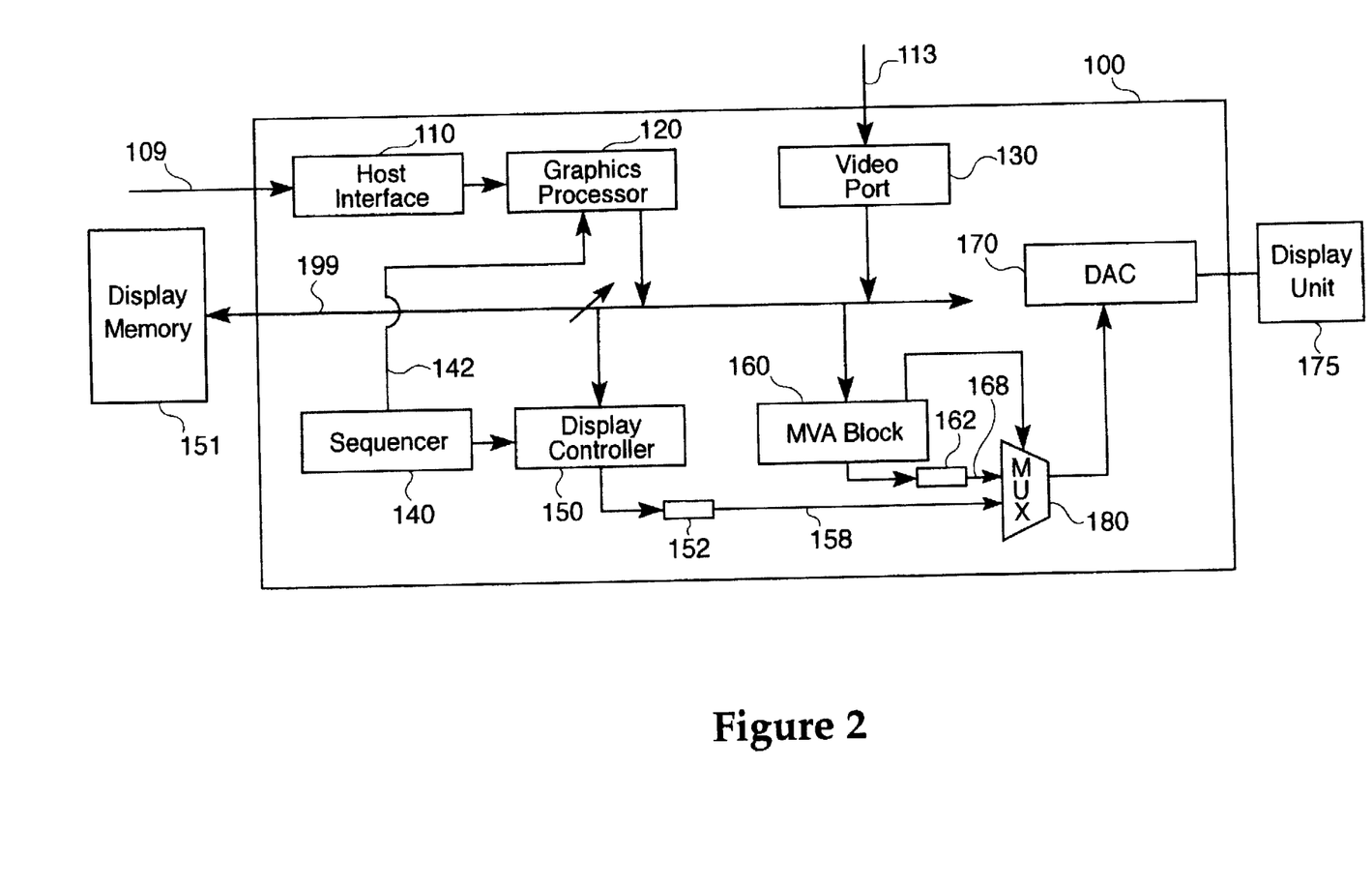
FIG. 2 is a block diagram of a graphics controller circuit comprising an X-major architecture stretch engine.

FIG. 2 is a block diagram of a prior art graphics controller chip 100 which stretches source video images, and generates display signals to display stretched video images. Video port 130 receives pixel data of a source video image on video input signal line 113 and stores source video image pixel data in display memory 151. MVA block 160 receives source video image pixel data from display memory 151, stretches the source video image if required, stores the resulting pixel data in video FIFO 162, and sends pixel data of the stretched video image on signal line 168.

In parallel to the video path, host interface 110 may receive pixel data of a graphics image and instructions over a host bus 109 such as a PCI bus. Graphics processor 120 may execute instructions such as line draw or block moves and generate additional pixel data. Graphics Processor 120 may store pixel data corresponding to the graphics image (including pixel data generated by executing instructions) in display memory 151. Display controller 150 may retrieve graphics data from display memory 151, store the graphics data in a display FIFO 152, and send corresponding pixel data over signal line 158.

Multiplexor 180 may receive (stretched) video image pixel data and graphics image pixel data from on lines 158 and 168 respectively, and select one of the two pixel data under control of select signal 185. Multiplexor 180 selects video image pixel data if a corresponding display on display unit 175 is a video image, and selects graphics pixel data otherwise.

Digital-to-analog converter (DAC) 170 may generate signals corresponding to the hardware architecture of display unit 175 from digital pixel data received from MUX 180. For example, DAC 170 may generate RGB analog signals for display unit 175 if display unit 175 is a CRT. It will be appreciated that the display unit may be any other type of display unit with corresponding hardware support without departing from the scope and spirit of the present invention.

Prior art stretch engines (for example MVA block 160) implementing stretch operations may operate as X-major engines to be compatible with display unit 175 which may display images in a scan line order. An X-major stretch engine may generate all pixel data corresponding to one row of an image before generating pixel data of a subsequent row. For example, with respect to FIG. 1, MVA block 160 may generate all pixel data corresponding to row 2 before generating pixel data corresponding to row 3. By generating pixel data of an entire row, stretch engines may provide pixel data in a scan line order to display unit 175. By providing the pixel data in the same order in which display unit 175 displays corresponding image, display circuitry in display unit 175 may be simplified.

X-major architecture stretch engines may require a large number of data fetches from display memory 151 for a stretch operation, and thereby lead to a performance bottleneck in graphics controller chip 100. The large number of fetches to display memory 151 may be required since pixel data from one source video image scan line may need to be retrieved multiple times to perform stretch operation. For example, to generate pixels R21-R26 of row 2 (in FIG. 1), MVA block 160 may retrieve pixel data of pixels R11, R16, R61, and R66 once. However, MVA block 160 may discard pixel data R11, R16, R61 and R66 while generating remaining pixel data (R27-End of Row 2) of row 2, and consequently may again retrieve pixel data R11, R16, R66 and R61 from display memory 151 for generating pixels R31-R36 of row 3.

Therefore, a stretch engine may retrieve each pixel datum in a source video image from display memory 151 as many times as the number of scan lines generated using the pixel datum. Multiple accesses of the same pixel datum may increase data traffic on bus 199, and as a result throughput performance of graphics controller chip 100 may be impaired.

To avoid such multiple accesses of each pixel datum, stretch engines may employ a local memory to store pixel data of an entire scan line. However, such local memory requirements may be costly. For example, at 24 bits per pixel, a scan line with 480 pixels may require 11,520 bits of local memory, which may be cost prohibitive. Such a large local memory may consume significant additional silicon space in graphics controller chip 100.

SUMMARY OF THE INVENTION

It is therefore an object of the present invention to provide a graphics controller chip which performs a stretch operation.

It is also an object of the present invention to decrease number of accesses to a display memory while performing a stretch operation of a source video image.

It is a further object of the present invention to minimize size of a local memory which may be required for stretching source video image.

These and other objects of the present invention are met by a stretching method which includes the step of receiving during a first iteration two pixel data of a first scan line and two pixel data of a second scan line of the source video image. The method of the present invention generates a first additional set of pixel data corresponding to a first portion of the stretched video image defined by the two pixel data of the first scan line and the two pixel data of the second scan line. The first portion comprises a plurality of scan lines with each scan line comprising a lesser number of pixel data than the stretched video image.

The method of the present invention also receives during each subsequent iteration a next pixel datum of the first scan line and a next pixel datum of the second scan line, and generates a next additional set of pixel data corresponding to a next portion of the stretched video image defined by the next pixel data received in each iteration and two pixel data received in a previous iteration. The stretched video image between the first scan line and the second scan line comprises pixel data in the next additional sets and the first additional set.

The present invention stores pixel data in the next additional sets and the first additional set in a display memory and displays the stretched video image in a scan line order. The step of generating the additional set of pixel data further comprises interpolating the two pixel data of the first scan line and the two pixel data of the second scan line to generate the first additional set of pixel data. The step of interpolating further comprises the step of interpolating first pixel datum of the first scan line and the first pixel datum of the second scan line to generate a first set of Y-interpolated pixel data, and interpolating second pixel datum of the first scan line and the second pixel datum of the second scan line to generate a second set of Y-interpolated pixel data. The present invention then interpolates corresponding pixel data in the first set of Y-interpolated pixel data and the second set of Y-interpolated pixel data to generate the first additional set of pixel data.

The method of the present invention also includes the step of storing each of the pixel data of the first set of Y-interpolated pixel data and providing the stored pixel data to the step of interpolating the corresponding pixel data in the first and second sets of Y-interpolated pixel data.

The method of the present invention further includes the step of storing the second pixel datum of both the first scan line and the second scan line in a local memory. The two stored pixel data are interpolated with a third pixel datum of the first scan line and a third pixel datum of the second scan line to generate a second set of additional pixel data corresponding to a second rectangular portion adjacent to the first rectangular portion of the stretched video image defined by the second pixel datum and the third pixel datum of the first scan line and the second scan line. By storing the second pixel datum of the first scan line and the second scan line, the method of the present invention avoids the necessity to fetch the stored pixels another time for generating the second rectangular portion.

Another aspect of the present invention includes a graphics controller circuit comprising a Y-Interpolator for receiving two pixel data of a first scan line and two pixel data of a second scan line of the source video image, wherein each of the two pixel data of the first scan line and the second scan line comprise a first pixel datum and a second pixel datum. The Y-Interpolator interpolates the first pixel datum of the first scan line and the second scan line to generate a first set of Y-interpolated pixel data. The Y-Interpolator interpolates the second pixel datum of the first scan line and the second pixel datum of the second scan line to generate a second set of Y-interpolated pixel data.

The graphics controller circuit of the present invention also includes a Y-storage for storing each of the first set of Y-interpolated pixel data. An X-interpolator in the graphics controller circuit receives each of the second set of Y-interpolated pixel data from the Y-interpolator and a corresponding pixel data in the first set of Y-interpolated pixel data from the Y-storage, and generates a first additional set of pixel data corresponding to a first rectangular portion of the stretched video image defined by the two pixel data of the first scan line and the two pixel data of the second scan line, wherein the first rectangular portion comprises a plurality of scan lines.

DETAILED DESCRIPTION OF THE INVENTION

Figure 3:
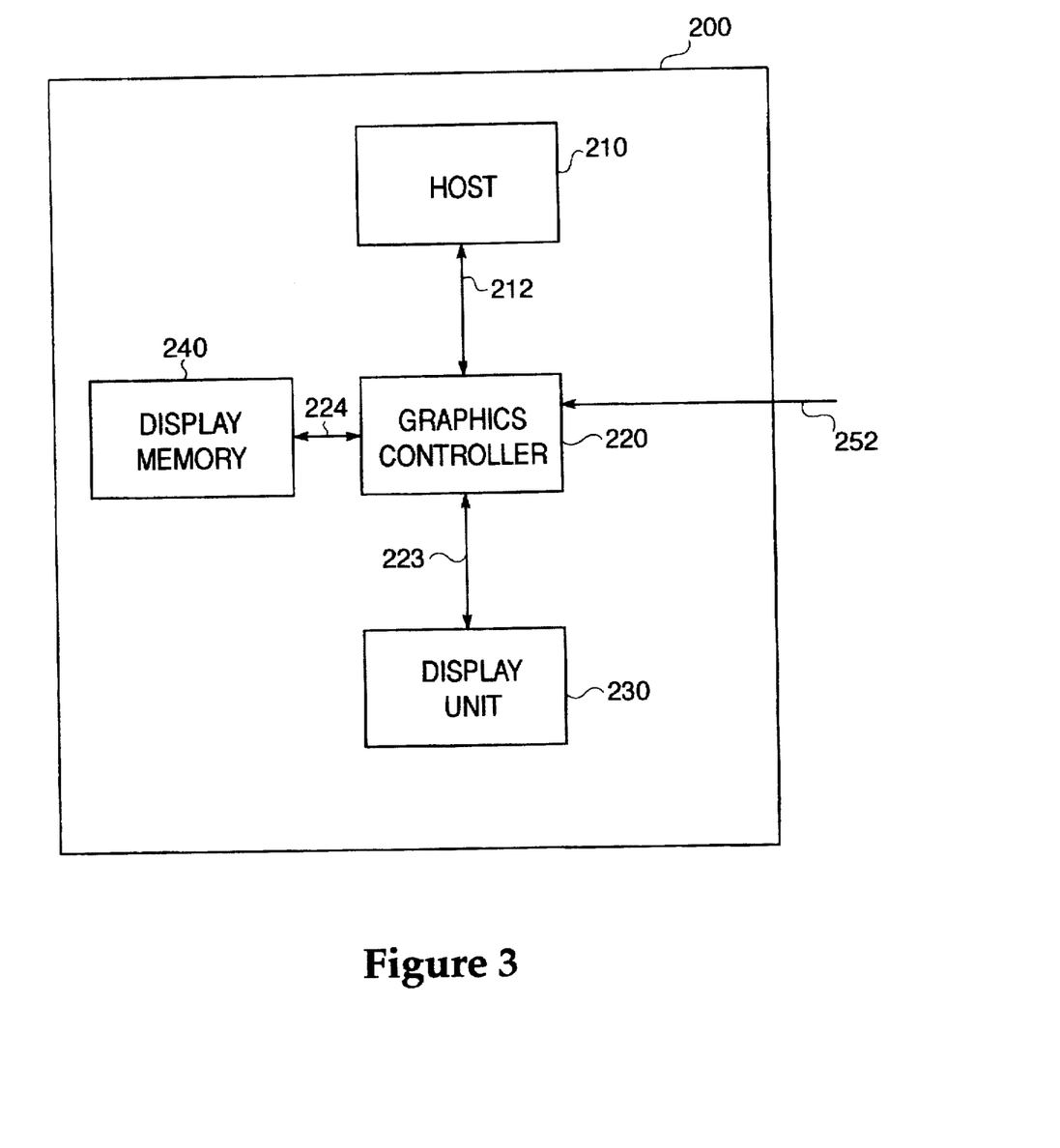
FIG. 3 is a block diagram of a computer system of the present invention including a graphics controller chip.

FIG. 3 is a block diagram of a computer system 200 of the present invention. Computer system 200 comprises host 210, graphics controller 220, display memory 240 and display unit 230. Display memory 240 may receive and store pixel data of a source video signal.

Graphics controller 220 of the present invention may minimize the number of pixel data accesses to display memory 240 by retrieving four pixel data comprising two pixel data from each of two adjacent scan lines of a source video image, and generating all additional pixels in a rectangular portion defined by the four pixel data. For example, with reference to FIG. 1, graphics controller 220 may retrieve pixel data R11, R61, R16 and R66 of the source video image, and generate all pixel data in rows 2-5 and columns 2-5 of the stretched video image from the four pixel data.

Graphics controller 220 may also retrieve pixel data R1b and R6b, and generate more pixel data of the stretched video image using pixel data R1b, R6b, R16 and R66. Graphics controller 220 may comprise a local storage such as registers to store pixel data R16 and R66 such that pixel data R16 and R66 may not need to be retrieved again for generating pixel data for pixels between R1b, R6b R16 and R66.

By generating pixel data of all pixels between four pixel data retrieved, graphics controller 220 may minimize the number of accesses to display memory 240 while performing a stretch operation. Graphics controller 220 may further minimize the number of accesses by providing local storage to store the two pixel data required for generating the next rectangular block of pixel data.

Graphics controller 220 may store the rectangular blocks of pixel data generated into display memory 240, and generate display signals of the stretched video image to display unit 230 in a scan line order.

Host 210 may send commands over System Bus 212 instructing Graphics controller 220 to perform stretch operations. Host 210 may send other types of information such as graphics or text data for display on display unit 230. System Bus 212 may comprise, for example, a PCI bus.

Display memory 240 may store pixel data of the source video image and the stretched video image. Display memory 240 may comprise a random access memory. Display memory 240 may also be known as a video memory or VMEM in the graphics controller arts. However, due to the advent of MotionVideo™ displays in computer systems, the term "display memory" may be a misnomer. Thus, for the purposes of this application, such a memory will be referred to as a display memory. MotionVideo™ is a trademark of Cirrus Logic, Inc., Fremont Calif.

Figure 4:
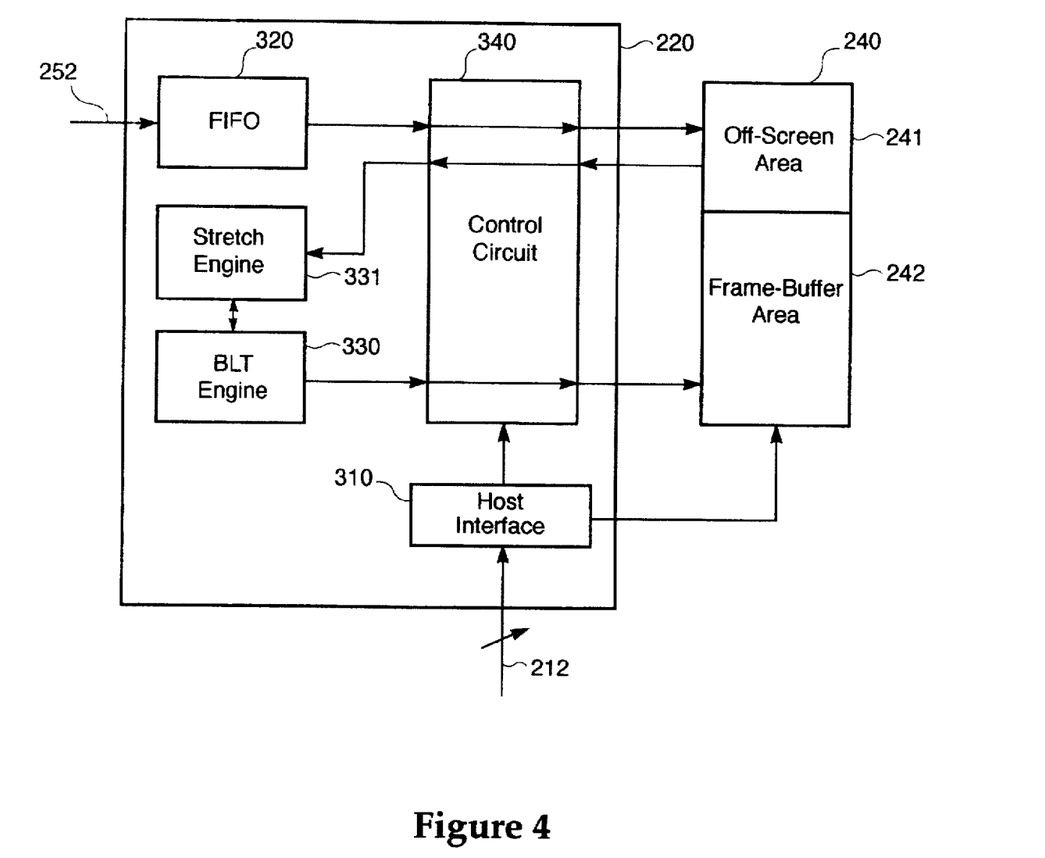
FIG. 4 is a block diagram of the graphics controller chip of the present invention including a stretch engine, a BLT engine, a FIFO, a display memory and a control circuit.

FIG. 4 is a block diagram illustrating in further detail display memory 240 and graphics controller 220 of the present invention. Display memory 240 may comprise frame buffer area 242 and off screen area 241. Frame buffer area 242 may store pixel data used to periodically refresh display on display unit 230.

Off screen area 241 may store pixel data of the source video image as pixel data is received over video path 252. Source video pixel data is temporarily stored in off screen area 241, processed for a stretch operation, and then stored in frame buffer area 242.

Graphics controller 220 may comprise host interface 310, FIFO 320, block transfer (BLT) engine 330, and control unit 340. Host interface 310 may be adapted to interface with the specific architecture implemented in System Bus 212, and may receive commands to stretch video images from host 210.

FIFO 320 may receive pixel data of a source video image over video path 252. FIFO 320 may provide control and timing signals to external devices (such as a video decoder) while receiving pixel data. FIFO 320 serves as a temporary storage area for source video pixel data before the pixel data is stored in off-screen memory 241.

FIFO 320 may be used to buffer source video image pixel data to compensate for the difference in the incoming pixel data rate on video path 252 and the rate which the pixel data is stored in off screen memory 241. For example, pixel data may be received at 24 bits/clock cycle over video path 252 while FIFO 320 may be sending 64 bits/clock cycle to frame buffer area 242. In addition, display memory 240 may also be unable to accept incoming video pixel data from FIFO 320 while BLT Engine 330 is accessing display memory 240, and consequently incoming video pixel data may need to be buffered in FIFO 320 until display memory 240 is ready to accept the incoming video pixel data.

Control circuit 340 may generate control signals to host interface 310, FIFO 320 and BLT engine 330 so as to coordinate and control access to the display memory 240. Control circuit 340 may comprise a memory arbiter for such coordination purposes. Control circuit 340 directs incoming source video image pixel data to be written into the off screen area 241 as the pixel data is received in FIFO 320. Control circuit 340 may also generate addresses of memory locations in display memory 240 to store the incoming video image pixel data and graphics data.

BLT engine 330 may receive and execute commands from Host Interface 310. Commands from host interface 310 may include block transfer (BLT) instructions.

To execute BLT instructions, BLT engine 330 determines the number of pixel data to be retrieved and a starting address of the memory location of the pixel data in display memory 240. BLT engine 330 may then request control circuit 340 to fetch the pixel data. Once data retrieval is complete, BLT engine 330 may receive a signal from Control circuit 340 indicating completion of data retrieval. In the preferred embodiment, BLT engine 330 retrieves up to a maximum of 128 bytes for each BLT operation. BLT engine 330 may retrieve a lesser number of bytes if such lesser number of bytes are required.

Figure 5:
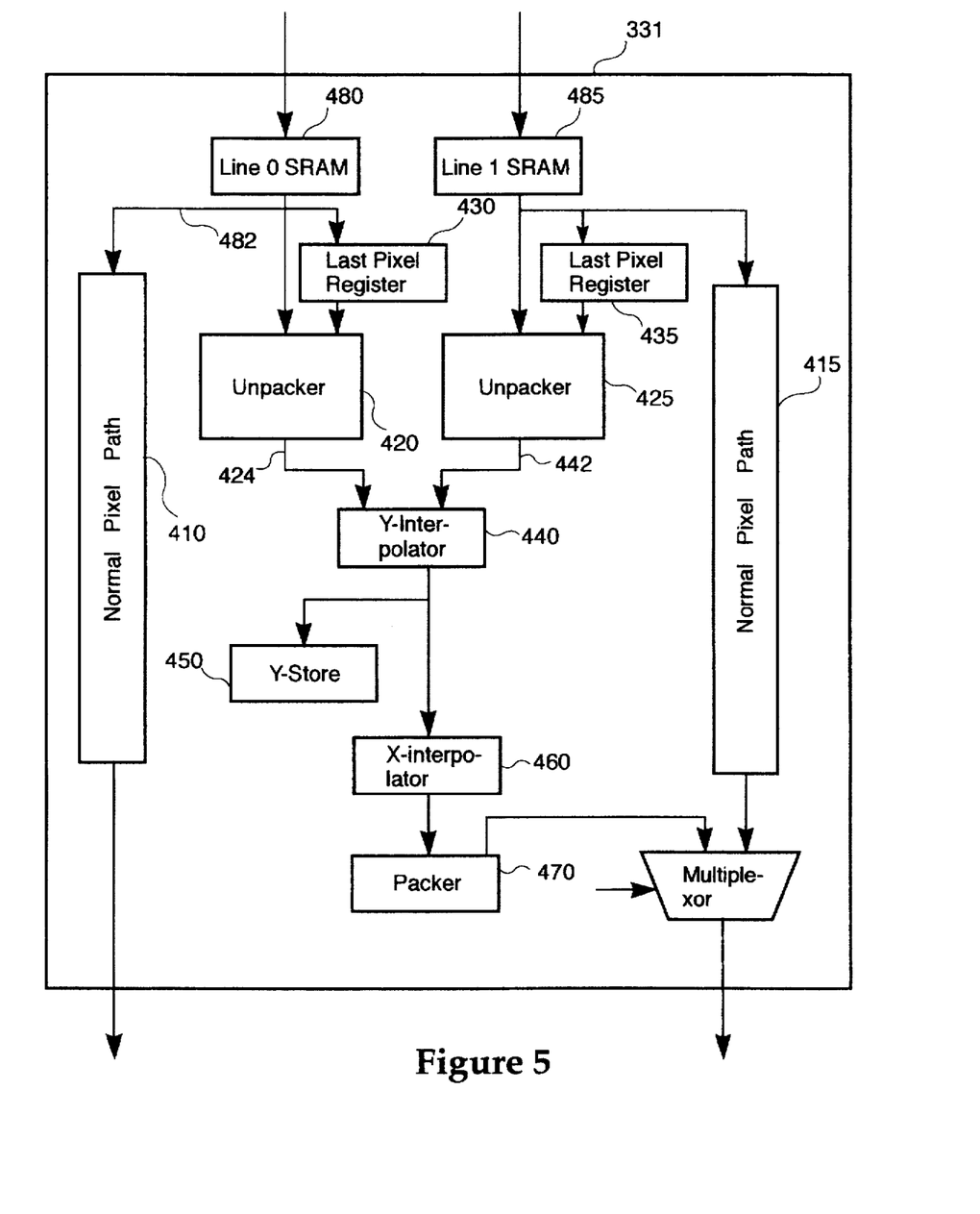
FIG. 5 is a block diagram illustrating further details of the logical components in the stretch engine and the display memory of the graphics controller chip.

FIG. 5 is a detailed block diagram of stretch engine 331. BLT engine 330 may store each of the 128-byte data sets required for stretch operation in either Line 0 SRAM 480, or Line 1 SRAM 485 located in stretch engine 331 as shown in FIG. 5. For a stretch operation, the SRAMS may store pixel data corresponding to adjacent scan lines. Once pixel data is fetched into the SRAMS, BLT engine 330 may send a signal to stretch engine 331 to begin a stretch operation. Once stretch engine 331 generates additional pixel data as a part of the stretch operation, BLT engine 330 may initiate BLT operations specifying a starting address and number of data bytes to store pixel data in frame buffer area 242.

Stretch engine 331 may unpack bits from 128-byte packets in SRAMs 480 and 485 into 24 bit pixel data, and perform a stretch operation on the unpacked pixel data. Stretch engine 331 may pack pixel data resulting from a stretch operation into 64-bit words and direct BLT engine 330 to initiate a store operation into frame buffer area 242.

Line 0 SRAM 480 and Line 1 SRAM 485 may respectively receive from Control circuit 340 pixel data of a first scan line and a second scan line of source video image on which a stretch operation is to be performed. In the preferred embodiment, first unpacker circuit 420 may receive first scan line pixel data over a 64-bit bus 482, and in conjunction with Line 0 last pixel register 430 generate one pixel datum per clock cycle on a 24-bit bus 424. Y-Interpolator 440, X-Interpolator 460 and Y-Store 450 may together operate to generate pixel data corresponding to the stretched video image.

Since pixel data required for a stretch operation may not be aligned with the first bit of the 64-bit input from bus 482, first unpacker circuit 420 may need to perform an alignment function to select appropriate intermediate bits in the 64-bit data. For example, if pixel data is received in an RGB 8:8:8 format, a required pixel may be stored starting from the eighth bit (i.e., bits 0–7 may be used to store a prior pixel) of a 64-bit input. In such a case, first unpacker circuit 420 may select pixel data starting from the eighth bit and send the following 24-bits (i.e., bits 8–31) on bus 424.

Line 0 last pixel register 430 may store the last four bytes of 64-bit input which may be combined with data in a subsequent 64-bit input to generate a complete pixel data. For example, the R component byte of a pixel may be stored in last eight bits (bits 56–63 ) of a first 64-bit input word, and the G and B components may be stored in a subsequent 64-bit input word (bits 0–15 ). Line 0 last pixel register 430 may store the last eight bits of the first 64-bit input word, and provide the eight bits to first unpacker circuit 420 when the subsequent 64-bits are received. First unpacker circuit 420 may then combine the last eight bits of the first 64 bit input word with the first sixteen bits of the subsequent 64-bits to generate the 24-bit pixel datum on bus 424.

Similarly, second unpacker circuit 425 and Line 1 last pixel register 435 may together operate to unpack 64 bit inputs into 24 bit pixel data, and send the pixel data on bus 442. Although the function of the unpacker circuits is explained with reference to pixel data in RGB 8:8:8 format, it will be appreciated that stretch engine 331 of the present invention operates in a similar manner for other types of pixel formats using a different number of bits. If pixel data is stored in less than 24 bits, some of the bits on the 24-bit bus 424 may be unused or set to zero in positions corresponding to most significant bits.

Figure 6:
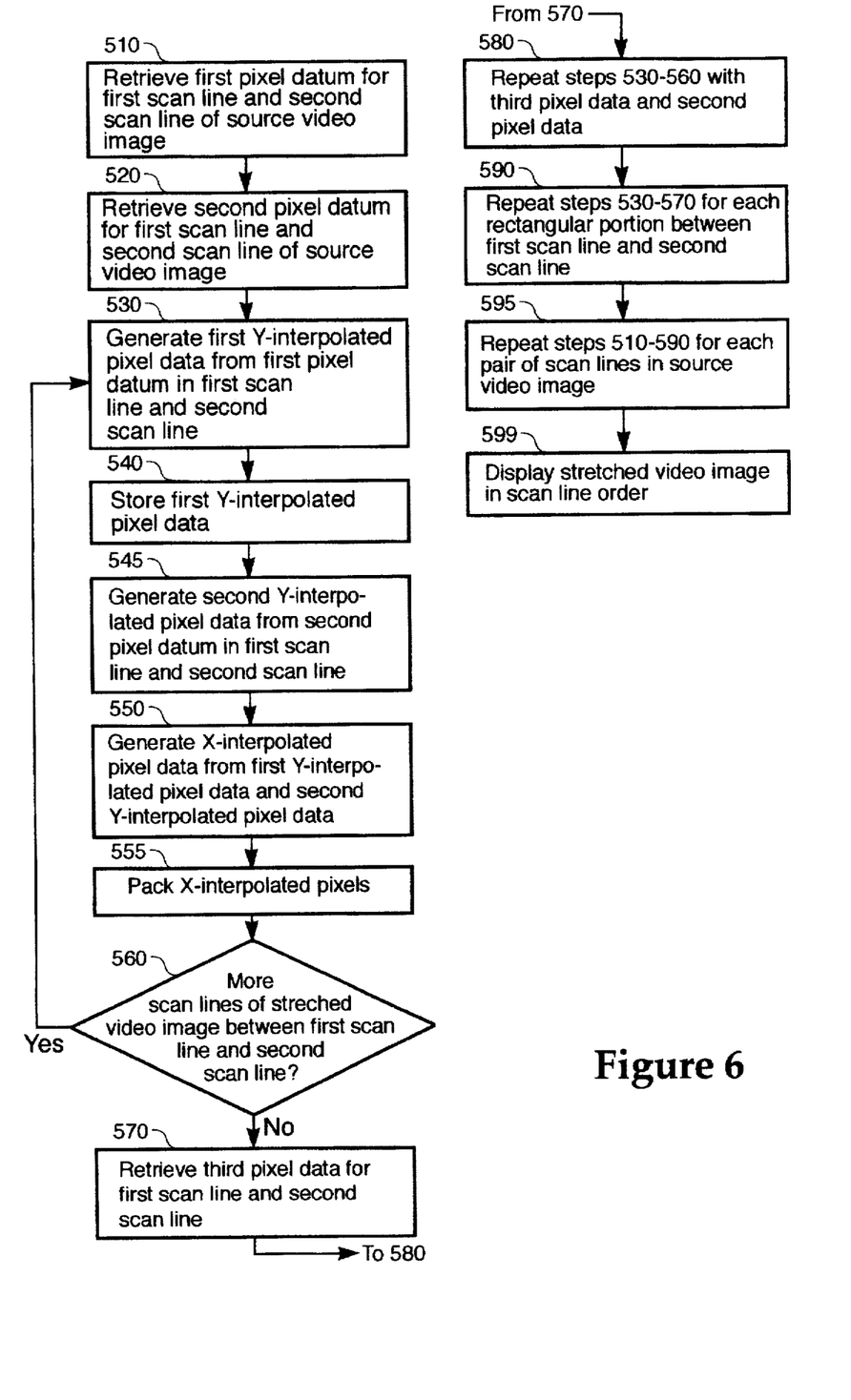
FIG. 6 is a flow-chart illustrating the steps in generating the stretched video image from a source video image in the present invention.

With reference to FIGS. 5 and 6, Y-interpolator 440 may receive a pixel datum each (For example R11 and R61 in FIG. 1) on buses 424 and 442 corresponding to line 0 and line 1 of a source video image respectively during a clock cycle in step 510, and another pixel datum each for line 0 and line 1 respectively (For example R16 and R66 in FIG. 1) during a subsequent clock cycle in step 520. Y-Interpolator 440 may include a storage space such as registers for storing the four pixel data received in steps 510 and 520.

Y-Interpolator 440 may then generate the first Y-interpolated pixel datum (R11 in FIG. 1) of the stretched video image in step 530 and store the first Y-interpolated pixel datum in Y-Store 450 in step 540. Y-Interpolator 440 may then generate second Y-interpolated pixel datum (R61 in FIG. 1), and send the second Y-interpolated pixel datum to X-Interpolator 460 in step 545. In the case of first scan line of the stretched video image, Y-Interpolator 440 may not need to perform any computations to generate the first Y-interpolated pixel datum because the first Y-interpolated pixel datum corresponds to pixel datum in the source video image.

In step 550, X-Interpolator 460 may generate an X-interpolated pixel datum (R12, R13, R14 and R15 of FIG. 1) during each clock cycle from the second Y-interpolated pixel data received from Y-Interpolator 440 and the first Y-interpolated pixel stored in Y-Store 450. In step 555, Packer 470 may receive X-interpolated pixels and pack the pixel data into 64-bit words for transfer by BLT engine 330.

Since there are additional scan lines (rows 2–5 in FIG. 1) in stretched video image, Y-Interpolator 440 may generate the first Y-interpolated pixel datum (R21) of the next scan line (i.e., row 2 of the stretched video image in FIG. 1) in step 530, and store the first interpolated pixel datum (R21) in Y-Store 450. Y-Interpolator 440 may then generate the second Y-interpolated pixel datum (R26) for row 2 of FIG. 1 and send the second Y-interpolated pixel datum to X-Interpolator 460. In step 550, X-interpolator 460 may generate pixel data between the two Y-interpolated pixels generated in steps 530 and 540, and packer 470 packs the pixel data into 64-bit words in step 555. Steps 530–555 are thus repeated for each of scan lines 1–5 of the stretched video image. Thus, using the four pixel data retrieved in steps 510 and 520, stretch engine 331 of the present invention may generate additional pixel data corresponding to a rectangular portion of scan lines 1–5 defined by the four pixel data in one iteration.

In step 570, Y-Interpolator 440 of the present invention may retrieve third pixel datum (R1B and R6B) of both the first scan line and the second scan line-of source video image. Y-Interpolator 440 may use third pixel datum of rows 1 and 6 (R1B, R6B) with two pixel data (R16 and R66) retrieved in step 520, and repeats steps 530 through 560 to generate additional pixel data in the rectangular area defined therebetween (i.e., between pixels R1b, R6b, R16 and R66).

Y-Interpolator 440 of the present invention includes storage space such as registers to store the two pixel data (i.e. second pixel datum of the first scan line and the second scan line) retrieved in step 520 such that the two pixel data need not be retrieved for interpolation with the third pixel data. During each iteration, Y-Interpolator 440 may repeat steps 510–570 to generate additional pixel data corresponding to each rectangular portion between the two scan lines of the source video image.

After generating pixel data for Rows 1 through 5, stretch engine 331 may generate pixel data for rows 6 through a of FIG. 1 in a similar manner. Stretch engine 331 may repeat the above steps 510–590 to generate additional pixel data corresponding to other scan lines (i.e., rows) in the stretched video image to generate pixel data for the complete image of the stretched video image.

In step 599, graphics controller 220 displays the video image stored in display memory 240 in a scan line order, i.e., display one scan line completely before beginning display of a subsequent scan line. Although graphics controller 220 of the present invention does not generate pixels in a scan line order, graphics controller 220 of the present invention may display stretched video image in a scan line order as pixel data of the stretched video image is stored in display memory 240. In contrast, computer system of prior art may display stretched video images in scan line order by displaying scan lines soon after corresponding pixel data is generated.

Continuing with reference to FIG. 5, stretch engine 331 of the present invention may further include normal pixel paths 410 and 415 for bypassing the stretch operation if the source video image need not be stretched. Such a bypass circuit serves to avoid hindering performance of graphics controller 220 when the source video image is not stretched and pixel data of the source video image need not be processed by the stretch logic circuit of the present invention.

Stretch engine 331 may further include multiplexor 416 coupled to normal pixel path 415 and packer 470. Multiplexor 416 may operate to select the output of packer 470 when the source video image is being stretched, and the output of normal pixel path 415 when the source video image is not being stretched.

As will be appreciated from the above, stretch engine 331 of the present invention retrieves each pixel datum in source video image data at most two times irrespective of the number of additional scan lines generated from the source video image pixel data to generate the stretched video image pixel data. Stretch engine 331 may retrieve pixel data of the first and last scan lines of the source video image only once.

In contrast, prior art graphics controllers may retrieve each pixel datum in the source video image as many times as the number of scan lines generated using the pixel datum. In the example in FIG. 1, pixel datum R61 may be retrieved ten times (once for each of rows 1–10) in prior art graphics controllers.

Also, Y-Interpolator 440 of the present invention may require storage space to store only two pixel data which may be used to generate additional pixel data of a next rectangle. Of the four pixel data, stretch engine 331 uses two pixel data for generating a following rectangular portion of pixel data, thereby circumventing the need to refetch the stored pixels for generating the following rectangular portion of pixel data. Hence, stretch engine 331 of the present invention minimizes number of pixel datum fetches from display memory 240, and requires local storage space to store only four pixel data.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of displaying a stretched video image from a source video image, wherein the source video image comprises a plurality of scan lines with each scan line being represented by a set of pixel data, the method comprising the steps of:

receiving two pixel data of a first scan line and two pixel data of a second scan line of the source video image;

generating a first additional set of pixel data for a plurality of intermediary scan lines of the stretched video image between the first scan line and the second scan line;

receiving a next pixel datum of the first scan line and a next pixel datum of the second scan line;

generating a next additional set of pixel data for a plurality of intermediary scan lines of the stretched video image defined by the next pixel data and one of the two pixel data of the first scan line and one of the two pixel data of the second scan line;

storing pixel data in the next additional set and the first additional set in a display memory; and displaying the stretched video image in a scan line order.

2. The method of claim 1 wherein the step of generating a first additional set of pixel data comprises the step of interpolating the two pixel data of the first scan line and the two pixel data of the second scan line to generate the first additional set of pixel data.

3. The method of claim 1 wherein each of the two pixel data of the first scan line and the second scan line comprise a first pixel datum and a second pixel datum, and wherein said step of generating a first additional set of pixel data further comprises the steps of:

interpolating the first pixel datum of the first scan line and the first pixel datum of the second scan line to generate a first set of Y-interpolated pixel data;

interpolating the second pixel datum of the first scan line and the second pixel datum of the second scan line to generate a second set of Y-interpolated pixel data; and interpolating corresponding pixel data in the first set of Y-interpolated pixel data and the second set of Y-interpolated pixel data to generate the first additional set of pixel data.

4. The method of claim 3 further comprising the step of storing each pixel datum in the first set of Y-interpolated pixel data and providing the stored pixel datum to the step of interpolating the corresponding pixel data.

5. The method of claim 3 further comprising the steps of packing a plurality of pixel data in the first additional set of pixel data into a single word.

6. The method of claim 1 wherein each of the two pixel data of the first scan line and the second scan line comprise a first pixel datum and a second pixel datum, said method further comprising the steps of:

storing the second pixel datum of the first scan line and the second pixel datum of the second scan line in a local memory; and providing the stored second pixel data from the local memory to the step of generating a next additional set of pixel data.

7. The method of claim 1 wherein each scan line in the first rectangular portion comprises a lesser number of pixel data than the first scan line.

8. A method of generating a stretched video image from a source video image, wherein the source video image comprises a plurality of scan lines with each scan line comprising a set of pixel data, said method comprising the steps of:

receiving two pixel data of a first scan line and two pixel data of a second scan line of the source video image;

generating a first additional set of pixel data for a plurality of intermediary scan lines of the stretched video image between the first scan line and the second scan line;

receiving a next pixel datum of the first scan line and a next pixel datum of the second scan line; and generating a next additional set of pixel data for a plurality of intermediary scan lines of the stretched video image defined by the next pixel data and one of the two pixel data of the first scan line and one of the two pixel data of the second scan line.

9. The method of claim 8 wherein each scan line in the first rectangular portion comprises a lesser number of pixel data than the first scan line.

10. A graphics controller circuit for generating a stretched video image from a source video image, wherein said source video image comprises a plurality of scan lines with each scan line being represented by a set of pixel data, said graphics controller chip comprising:

a Y-Interpolator for receiving two pixel data of a first scan line and two pixel data of a second scan line of the source video image, wherein each of the two pixel data of the first scan line and the second scan line comprise a first pixel datum and a second pixel datum, the Y-Interpolator interpolating the first pixel datum of the first scan line and the second scan line to generate a first set of Y-interpolated pixel data, the Y-Interpolator interpolating the second pixel datum of the first scan line and the second pixel datum of the second scan line to generate a second set of Y-interpolated pixel data;

a Y-storage for storing each of the first set of Y-interpolated pixel data;

an X-interpolator for receiving each of the second set of Y-interpolated pixel data from the Y-interpolator and a corresponding pixel data in the first set of Y-interpolated pixel data from the Y-storage, the X-Interpolator generating a first additional set of pixel data corresponding to a first rectangular portion of the stretched video image defined by the two pixel data of the first scan line and the two pixel data of the second scan line, wherein the first rectangular portion comprises a plurality of scan lines, and wherein each scan line in the first rectangular portion comprises a lesser number of pixel data than the first scan line.

11. The graphics controller circuit of claim 10 further comprising a packer circuit for receiving the two pixel data of the first scan line in a single word from a display memory, and for unpacking the two pixel data prior to sending the two pixel data to the Y-interpolator circuit.

12. The graphics controller circuit of claim 11 further comprising a packer for packing a plurality of the first additional set of pixel data into a single word.

13. The graphics controller circuit of claim 12 further comprising a FIFO for receiving pixel data corresponding to the source video image and for storing the pixel data corresponding to the source video image in an off-screen area of the display memory.

14. The graphics controller circuit of claim 13 further comprising a transfer circuit for retrieving the single word comprising the two pixel data of the first scan line, and for sending the single word comprising the first scan line to the packer.

15. The graphics controller circuit of claim 14 further comprising a last pixel register coupled to the unpacker, the last pixel register storing a portion of the single word comprising the two pixel data of the first scan line, wherein the portion comprises part of a fifth pixel data stored in the single word and wherein another part of the fifth pixel data is stored in another single word.

16. The graphics controller circuit of claim 15 further comprising a normal pixel path for bypassing the packer, the X-Interpolator, the Y-Store, the X-Interpolator, and the Packer if the source video image is not required to be stretched.

17. The graphics controller circuit of claim 10 further comprising a storage space for storing the second pixel datum of the second scan line and the second pixel datum of the first scan line, wherein the graphics controller circuit uses the two second pixel data, and a third pixel datum from the first scan line and a third pixel data from the second scan line to generate a second additional set of pixel data corresponding to a second rectangular portion of the stretched video image defined by the second pixel data and the third pixel data.

18. A computer system for displaying a stretched video image of a source video image, each of the stretched video image and the source video image comprising a plurality of scan lines with each scan line being represented by a set of pixel data, said computer system comprising:

a display memory for storing a set of pixel data for the source video image;

a display unit for displaying the stretched display image; and a graphics controller for receiving two pixel data of a first scan line and two pixel data of a second scan line of the source video image, the graphics controller generating a first additional set of pixel data for a plurality of intermediary scan lines of the stretched video image between the first scan line and the second scan line, the graphics controller further receiving a next pixel datum of the first scan line and a next pixel datum of the second scan line and generating a next additional set of pixel data for a plurality of intermediary scan lines of the stretched video image defined by the next pixel data and one of the two pixel data of the first scan line and one of the two pixel data of the second scan line, the graphics controller storing the first additional set of pixel data and the next additional set of pixel data in the display memory.

19. The computer system of claim 18 wherein the graphics controller circuit comprises:

a Y-Interpolator for receiving two pixel data of a first scan line and two pixel data of a second scan line of the source video image, wherein each of the two pixel data of the first scan line and the second scan line comprise a first pixel datum and a second pixel datum, the Y-interpolator interpolating the first pixel datum of the first scan line and the second scan line to generate a first set of Y-interpolated pixel data, the Y-Interpolator interpolating the second pixel datum of the first scan line and the second pixel datum of the second scan line to generate a second set of Y-interpolated pixel data;

a Y-storage for storing each of the first set of Y-interpolated pixel data;

an X-interpolator for receiving each of the second set of Y-interpolated pixel data from the Y-interpolator and a corresponding pixel data in the first set of Y-interpolated pixel data from the Y-storage, the X-Interpolator generating a first additional set of pixel data corresponding to a first rectangular portion of the stretched video image defined by the two pixel data of the first scan line and the two pixel data of the second scan line, wherein the first rectangular portion comprises a plurality of scan lines.

20. The computer system of claim 19 wherein the graphics controller circuit comprises a packer circuit for receiving the two pixel data of the first scan line in a single word from the display memory, and for unpacking the two pixel data prior to sending the two pixel data to the Y-interpolator circuit.

21. The computer system of claim 20 wherein the graphics controller circuit further comprises a packer for packing a plurality of the first additional set of pixel data into a single word.

22. The computer system of claim 21 wherein the graphics controller circuit further comprises a FIFO for receiving pixel data corresponding to the source video image and for storing the pixel data corresponding to the source video image in an off-screen area of the display memory.

23. The computer system of claim 22 further comprising a last pixel register coupled to the unpacker, the last pixel register storing a portion of the single word comprising the two pixel data of the first scan line, wherein the portion comprises part of a fifth pixel datum stored in the single word and wherein another part of the fifth pixel datum is stored in another single word.

24. The computer system of claim 23 further comprising a storage space for storing the second pixel datum of the second scan line and the second pixel datum of the first scan line, wherein the graphics controller circuit uses the two second pixel data, and a third pixel datum from the first scan line and a third pixel data from the second scan line to generate a second additional set of pixel data corresponding to a second rectangular portion of the stretched video image defined by the second pixel data and the third pixel data.

* * * * *